United States Patent [19]
Flynn

[11] 3,874,588

[45] Apr. 1, 1975

[54] APPARATUS AND METHOD FOR IMPROVING WATER DISTRIBUTION FROM ROTARY SPRINKLERS

[75] Inventor: Charles J. Flynn, Glendora, Calif.

[73] Assignee: Anthony Manufacturing Corporation, Azusa, Calif.

[22] Filed: May 28, 1974

[21] Appl. No.: 473,767

[52] U.S. Cl.................. 239/11, 239/206, 239/230, 239/DIG. 1
[51] Int. Cl............................................ B56b 17/04
[58] Field of Search ......... 239/206, 230, 11, DIG. 1

[56] References Cited
UNITED STATES PATENTS

| | | | |
|---|---|---|---|
| 3,127,110 | 3/1964 | Reynolds | 239/206 |
| 3,666,181 | 5/1972 | Healy | 239/206 |
| 3,702,173 | 11/1972 | Reynolds | 239/206 |
| 3,715,078 | 2/1973 | Reynolds | 239/206 |
| 3,771,723 | 11/1973 | Ray | 238/230 |

*Primary Examiner*—Lloyd L. King
*Attorney, Agent, or Firm*—Fulwider, Patton, Rieber, Lee & Utecht

[57] ABSTRACT

A rotary water sprinkler for irrgation either a part circle or a full circle, the sprinkler comprising a housing within which a tubular water outlet stem is supported for rotation, a discharge nozzle secured to the end of the stem, and a water operated motor for rotating the stem. Means are provided within the housing for imparting a uniform and orderly spinning motion in one direction to the water entering the stem and for periodically reversing the direction of water spin. Within the stem are biased vane means which act to permit water spinning in one direction to pass through the nozzle in the spinning condition and to cancel the spinning motion when the water is spinning in the reverse direction.

11 Claims, 8 Drawing Figures

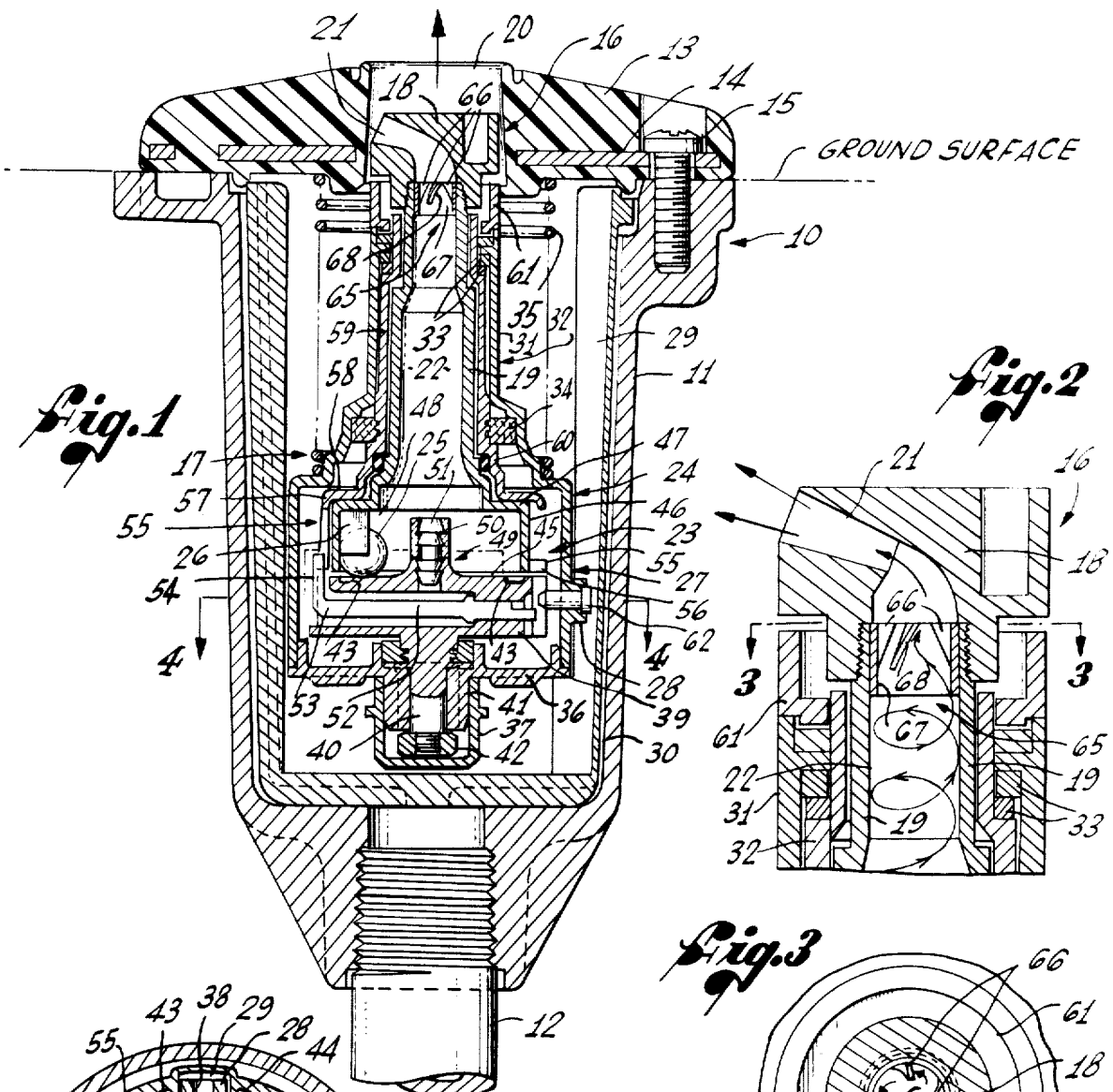
Fig.1
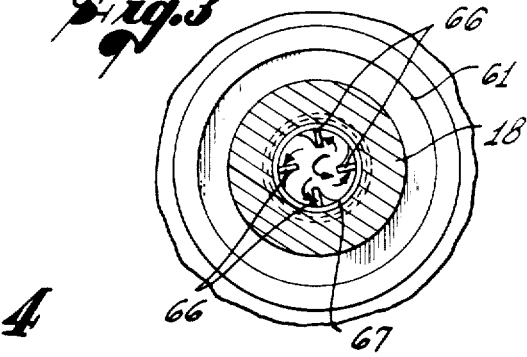
Fig.2
Fig.3
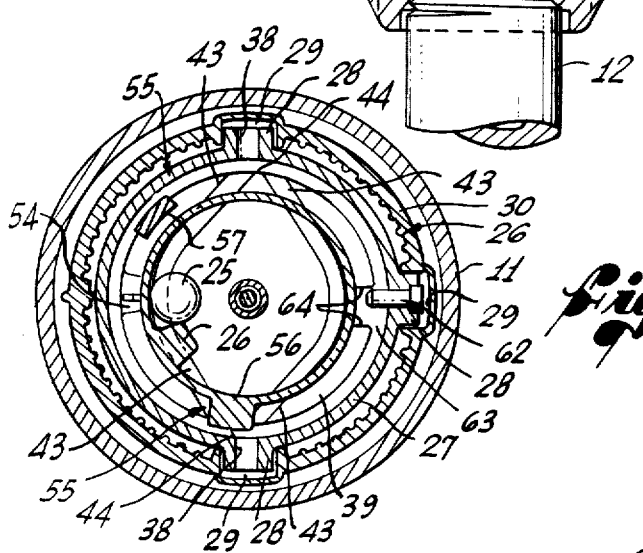
Fig.4
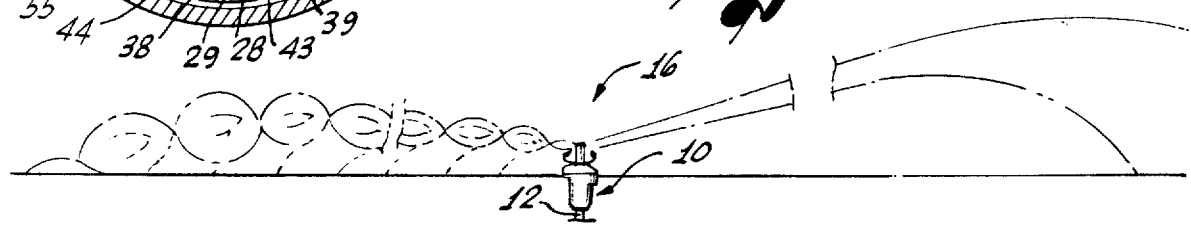
Fig.5

APPARATUS AND METHOD FOR IMPROVING WATER DISTRIBUTION FROM ROTARY SPRINKLERS

BACKGROUND OF THE INVENTION

This invention relates to rotary water sprinklers intended primarily for use in the irrigation of plants, and more particularly, to a new and improved apparatus and method for enhancing distribution of the water fall out from such sprinklers.

Typically, rotary sprinklers are permanently installed to irrigate a circular or partially circular area around the sprinkler, the size of the area covered depending upon numerous considerations such as the type of sprinkler, the size of the sprinkler nozzle, and the water supply pressure. Such sprinklers may be of either the type that rotate in only one direction and throw a stream of water to cover a full circle or of the type which include reversing means for periodically reversing the direction of rotation to affect continuous watering of only a part circle around the sprinkler.

In the ideal case, rotary sprinklers should provide a water fall out from the ejected stream which effectively covers the entire area from the sprinkler location to the outer boundary of the water throw from the sprinkler nozzle, with the water fall out distribution decreasing continuously and uniformly from the sprinkler location outwardly to the outer boundary of the water throw. In practice, however, most rotary sprinklers are designed to maximize the distance of throw with the result that the water fall out is usually concentrated near the outer boundary with little fall out occurring over a relatively large portion of the area between the sprinkler location and the area of high concentration.

In an attempt to improve water distribution, various methods and devices have been proposed for periodically interrupting the water stream to reduce the distance of throw and cause bursts of water to fall out quickly. One device of this general type is disclosed in U.S. Pat. No. 3,602,431 wherein interruptor vanes are periodically driven through the fluid rearward of the nozzle inlet to cause the fluid to periodically swirl as it passes through the nozzle and produce bursts of swirling and randomly moving water particles which fall out rapidly after leaving the nozzle.

While devices of the foregoing types have proved somewhat successful in enhancing water fall out distribution over the area irrigated by the sprinkler, bursts of randomly oriented water particles tend to fall out too quickly to effectively cover the entire area between the sprinkler and the area of high concentration. The result is that two areas of high water concentration are often present, one immediately adjacent the sprinkler, and one near the outer boundary with an intermediate area which receives little fall out.

SUMMARY OF THE INVENTION

The present invention provides an apparatus and method for enhancing the distribution of water fall out over the area irrigated by a rotary sprinkler by imparting to the water before passing through the sprinkler nozzle a uniform and orderly spinning motion in one direction, periodically reversing the direction of spin of the water, and cancelling the spin in only one of the two directions so that when the spin is cancelled, the water passing through the nozzle is collimated for maximum distance of throw, and when the spin is not cancelled, the water passes through the nozzle in the spinning condition to produce an early but controlled fall out. With the present invention, water fall out over substantially the total area irrigated by the rotary sprinkler is enhanced, and in a manner which is effective and reliable in use and with an apparatus which is simple and relatively inexpensive to manufacture.

In accordance with the invention, stationary bias means are provided to cancel the spinning motion of water and collimate the flow entering the nozzle when the water is spinning in one direction, and to permit water spinning in the opposite direction to pass through the nozzle substantially uninhibited by the bias means. The bias means comprise one or more vanes which project into the water path adjacent the nozzle on the up stream side, and positioned to react with the water when spinning in one direction, and to permit the water to flow smoothly over the vane without substantial interference when spinning in the opposite direction.

In one embodiment, the bias means are incorporated in a reversible part circle sprinkler which has a water driven motor for reversing the direction of nozzle rotation by reversing the direction the water spins within the sprinkler. In a second embodiment, the bias vanes are incorporated in a full circle sprinkler having a water motor which rotates the nozzle in only one direction. In this embodiment, means are provided for periodically reversing the direction of water spin within the sprinkler prior to entry into the nozzle.

Many other features and advantages of the present invention will become more apparent from the following detailed description taken in conjunction with the accompanying drawings which disclose, by way of example, the principles of the invention.

DESCRIPTION OF THE DRAWINGS

FIG. 1 is a fragmentary side sectional view of a part circle sprinkler including a nozzle, stem, and motor mounted within a covered housing, and within which the present invention is embodied;

FIG. 2 is an enlarged fragmentary sectional view of the nozzle and upper portion of the stem of the sprinkler of FIG. 1;

FIG. 3 is a fragmentary sectional view taken substantially along line 3—3 of FIG. 2;

FIG. 4 is a sectional view taken substantially along line 4—4 of FIG. 1;

FIG. 5 is a diagrammatic illustration of the sprinkler of FIG. 1 when in use;

DETAILED DESCRIPTION

Figure 6:
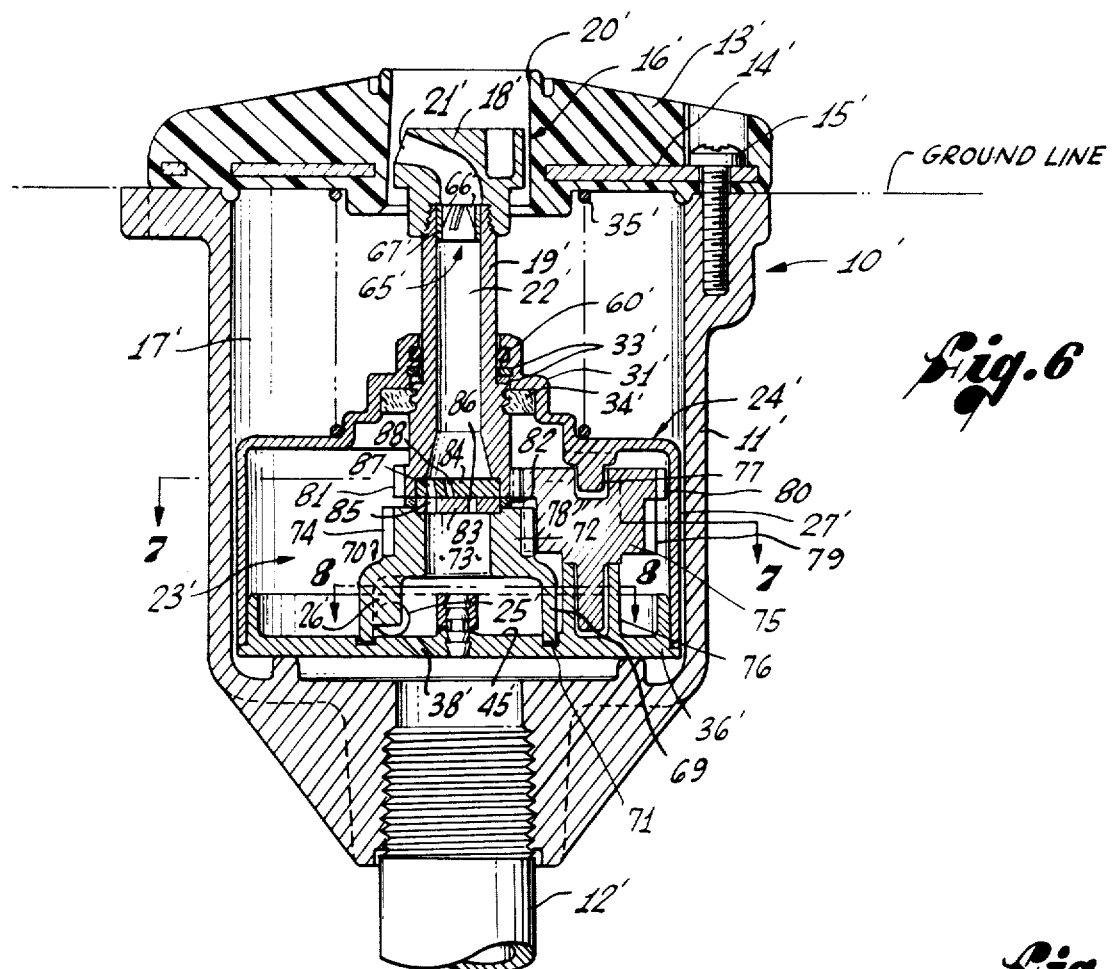
FIG. 6 is a fragmentary sectional view of another embodiment of the invention as employed in a full circle type sprinkler.

As shown in the exemplary drawings, the present invention is embodied in a new and improved apparatus and method for use in a rotary sprinkler 10 of the type which throws a stream of water outwardly from the sprinkler to cover a generally circular or partially circular area as the sprinkler rotates. In this instance, referring to the embodiment of FIG. 1, the sprinkler 10 is a part circle device of the pop-up type having a generally cup shaped case or housing 11 threaded at its lower end to the end of a water supply pipe 12 and intended to be buried in the ground with the upper end of the housing substantially flush with the ground surface, the upper end of the housing herein being closed by a rubber disk shaped cover 13 reinforced by a metal plate 14 and secured by screws 15 to the housing.

As shown in FIG. 1, within the housing 11 is a discharge nozzle member 16 coupled to a part circle sprinkler drive mechanism 17 which can be adjusted to rotate the nozzle in alternate directions through an arc of preselected size for irrigating a sector shaped area. The nozzle 16 herein comprises a plastic molding 18 threaded to the upper end of a tubular water outlet stem 19 and projecting centrally through an opening 20 in the cover 13 and into the housing 11, and has a generally frusto-conical nozzle opening 21 at one side which communicates with a central water passage 22 through the stem. When in use, water pressure from the supply pipe 12 extends the nozzle above the cover 13 by raising the stem 19 and drive mechanism 17 in the direction of the arrow of FIG. 1.

For rotating the nozzle 16, the drive mechanism 17 herein includes a reversible water driven motor 23 of the general type disclosed in U.S. Pat. No. 3,782,638. The motor 23 is supported in a casing 24 and drives the nozzle 16 in one direction by imparting a spinning motion to water entering the casing and causing a drive ball 25 to impact in one direction against an anvil 26 attached to the stem 19 supporting the nozzle. Reversal of the direction of rotation of the nozzle 16 is achieved by reversing the direction of spin of the water entering the casing 24 of the motor 23 and the resultant impact direction of the ball 25 against the anvil 26.

As can be seen in FIGS. 1 and 4, the motor casing 24 includes a central cylindrical section 27 which is keyed against rotation inside the housing 11 by laterally projecting bosses 28 forming keys which are slideably engaged in longitudinal keyways 29 defined by channels extending longitudinally along the sidewall of a basket shaped strainer 30 secured inside the housing 11. Upstanding from the central section 27 of the casing 24 is a tubular section 31 surrounding the stem 19 and within which the stem is mounted for relative rotation. In this instance, the stem 19 is mounted within a tubular sleeve 32 rotatably supported within the tubular section 31 of the casing 24 adjacent its upper end by a pair of stacked thrust bearings 33, and adjacent its lower end, by a single journal bearing 34 which also functions as a filter to permit water to flow between the sleeve and tubular section for lubrication. Disposed around the tubular section 31 of the casing 24 is a coil type spring 35 lightly compressed between the underside of the cover 13 and the central section 27 of the casing, the spring serving to bias the casing, stem 19, and nozzle 16 to the retracted position shown in FIG. 1.

The lower end of the central section 27 of the casing 24 is closed by a bottom plate 36 and downwardly projecting end cap 37 so that the casing totally encloses the motor 23. Water from the supply pipe 12 entering the housing 11 passes through the strainer 30 and is admitted under pressure into the motor casing 24 through lateral inlet conduits or ports 38 (see FIG. 4) in the casing at the location of two diametrically opposed bosses 28.

Within the casing 24, is a swirl plate 39 disposed adjacent the inlet ports 38 and which imparts either a clockwise or a counterclockwise spinning motion to the water entering the casing, as viewed in FIG. 4. The swirl plate 39 is secured to a center shaft 40, rotatably supported by a bearing boss 41 projecting from the bottom plate 36 of the motor casing 24 inside the cap 37, and is held in place by a retainer nut 42 threaded to the shaft.

The swirl plate 39 has a generally circular horizontal cross-section with ramp like channels 43 in the sidewall, and which have tapering sides converging to the formation of two diametrically opposed pointed ends 44 adjacent the inlet ports 38. The channels 43 extend arcuately from the pointed ends 44 upwardly to the upper surface 45 of the swirl plate 39 so that an upwardly and radially outwardly directed path is formed by each channel.

The locations of the pointed ends 44 of the channels 43 in the swirl plate 39 relative to the inlet ports 38 determine the direction the motor 23 drives the nozzle 16. In the condition shown in FIG. 4, the pointed ends 44 of the swirl plate 39 are shown positioned to impart a counterclockwise rotation to the nozzle 16 by spinning the water entering through the inlet ports 38 in a counterclockwise direction.

As can be seen in FIG. 4, each of the pointed ends 44 is disposed adjacent one wall of the inlet ports 38 so that entering water is deflected along the channels 43 in a counterclockwise direction. Since the channels 43 extend upwardly from the pointed ends 44, when the water reaches the upper surface 45 of the swirl plate 39, it will have an upwardly directed and counterclockwise spinning motion which will continue through the chamber containing the ball 25 above the swirl plate, and into the central water passage 22 of the stem 19.

The ball 25 for driving the nozzle 16 is disposed for free movement on the upper surface 45 of the swirl plate 39 and is confined radially by the lower end portion 46 of the stem which is formed as an enlarged diameter cylindrical flange and which prevents the ball from moving radially outwardly off the swirl plate. The lower end portion 46 of the stem 19 is coupled to the upper portion of the stem by a generally horizontal portion 47 which acts as a cover to prevent the ball 25 from leaving its chamber 48 and moving upwardly with the water into the upper portion of the stem.

Water spinning through the ball chamber 48 forces the ball to move in the direction of the water until the ball strikes the anvil 26 which is formed as an inwardly projecting abutment surface on the lower portion 46 of the stem 19. When the ball 25 strikes the anvil 26, the force of impact causes the stem 19 to undergo an incremental rotation. Due to the spinning motion of the water in the ball chamber 48, after impact the ball 25 moves radially inwardly and around the anvil 26 to again travel around the chamber and strike the anvil. In this manner, the stem 19 and nozzle 16 are rotated in incremental steps in the direction of water spin.

To prevent the ball 25 from moving diametrically across the chamber 48 after impact with the anvil 26 and to keep the ball rotating around the periphery of the chamber, a shaft 49 is provided upstanding from the center of the swirl plate 39. In this instance, the shaft 49 is formed by a resilient sleeve 50 formed of polyurethane and secured by an anchor pin 51 secured in a hole in the swirl plate 39.

For controlling the arc of rotation of the sprinkler nozzle 16 the swirl plate 39 includes a trigger spring 52 fixed at one end, the right end in FIG. 1, to the swirl plate and extending through cavity 53 formed laterally across and through the plate below the channels 43. The spring 52, herein a leaf-type spring, projects out of one side of the swirl plate 39, the left side as shown in FIG. 1, intermediate the pointed ends 44 of the channels 43, and has an upstanding end portion or trip arm 54 projecting above the upper surface 45 of the swirl plate.

The upper portion of the trip arm 54 is disposed to be engageable by either of two trip operators 55 to effect a reversal of the direction of rotation of the nozzle 16. As illustrated in FIGS. 1 and 4, one of the trip operators 55 is formed by a projection 56 extending outwardly from the side of the lower portion 46 of the stem 19, and the other trip operator is formed as a finger 57 projecting downwardly from the lower portion 58 of the sleeve 32 between the stem 19 and the upper tubular section 31 of the motor casing 24.

Control of the arc of rotation of the nozzle 16 is achieved by adjustment of the position of the trip finger 57 relative to the projection 56 of the stem 19. The upper portion 59 of the sleeve 32 surrounding the stem 19 is frictionally coupled with the stem for simultaneous movement with the stem by a resilient O-ring packing seal 60 near the lower end and which prevents water leakage between the sleeve and stem. Coupled to the top of the upper end of the sleeve 32 is an adjustment collar 61 which has a splined connection with the sleeve. By holding the nozzle 16 and stem 19 stationary, the arcuate position of the trip finger 57 can be changed relative to the projection 56 by relative rotation of the stem 19 and sleeve 32 through manual rotation of the collar 61 with sufficient force to overcome the frictional coupling with the stem.

With the swirl plate 39 in the condition shown in FIG. 4, when the sprinkler is operated, incremental rotation of the stem 19 by the ball 25 will produce simultaneous counterclockwise rotation of the sleeve 32 and its trip finger 57. When the trip finger 57 engages the trip arm 54 of the spring 52, the trip arm end of the spring will deflect in a counterclockwise direction until sufficient force has been stored in the spring to overcome the friction forces of the shaft 40 mounting the swirl plate 39 and the water acting against the sides of the channels 43, and cause the swirl plate to also rotate with a snap action. Rotation of the swirl plate 39 to compensate for the build up in spring force causes the pointed ends 44 of the channels 43 to move across the inlet ports 38, thereby causing the incoming water to spin in the clockwise direction and reversing the direction of rotation of the stem 19 and nozzle 16.

For preventing the swirl plate 39 from rotating so far that the pointed ends 44 of the channels 43 move far beyond the sides of the inlet ports 38, a limit stop pin 62 is provided through the motor casing 24. The stop pin 62 projects into a recess 63 in the side of the swirl plate 39 and upon arcuate movement of the swirl plate to change the rotational direction of the nozzle 16, one of the sides 64 of the recess will abut the pin and prevent further rotation of the plate in that direction.

Assuming that the trip finger 57 of the sleeve 32 has engaged the trip arm 54 of the spring 52 and has caused the swirl plate 39 to rotate so that the pointed ends 44 of the channels 43 are now on the opposite sides of the inlet ports 38 from that shown in FIG. 4, the clockwise spinning of the water through the motor 23 and into the stem 19 will produce an incremental rotation of the stem and sleeve in a clockwise direction. As clockwise rotation proceeds, the trip projection 56 of the stem 19 will eventually engage the trip arm 54 of the spring 52 causing the swirl plate 39 to snap back to the position shown in FIG. 4 and again rotate the sprinkler in a counterclockwise direction.

As can be appreciated, while the nozzle 16 is being driven in a counterclockwise direction, water traveling up the stem 19 toward the nozzle will move in a spiral path with the water particles having a substantially uniform and orderly counterclockwise spin. Similarly, while the nozzle 16 is being driven in the clockwise direction the water will travel up the stem 19 in a spiral path with a substantially uniform and orderly spinning motion in a clockwise direction.

In substantially any sprinkler, to obtain the maximum distance of water throw for a given nozzle, water pressure, and volume of flow, the water passing through the nozzle should be in a collimated flow condition with substantially all of the motion of the water particles being essentially parallel with the center line of the nozzle. In such a situation, the ejected stream will emerge from the nozzle as a tight stream of water particles which will tend to stay together with little fall out occurring until near the end of the stream trajectory.

On the other hand, to maximize rapid fall out of water from a given nozzle, with a given water pressure and volume of flow, the flow through the nozzle should be such that the water particles have a high component of tangential motion with respect to the center line of the nozzle so that on leaving the nozzle, the water particles will rapidly expand outwardly in a generally radial direction. For controlled early fall out, the water particles passing through the nozzle should be uniformly spinning in an orderly manner so that on emerging from the nozzle, the outer water particles in the flow will expand radially at a rapid rate and the inner water particles of the flow will travel further from the nozzle and expand radially at a slower rate.

In accordance with a primary aspect of the invention, distribution of water over the area irrigated by the part circle rotary sprinkler 10 is enhanced by permitting the uniform and orderly spinning motion of the water entering the stem 19 to continue through the nozzle 16 while the nozzle is rotating in one direction so that early but controlled fallout is achieved, and cancelling the spin of the water when the nozzle is rotating in the opposite direction so that the flow through the nozzle is collimated to obtain maximized throw of water during rotation in that direction. Toward these ends, stationary bias means 65 are provided in the stem 19 adjacent the nozzle 16 which will cancel spinning motion of the water entering the nozzle with one direction of spin, and which will not inhibit the spinning motion of the water entering the nozzle with the opposite direction of spin.

More specifically, as can best be seen in FIGS. 2 and 3, the bias means 65 comprise one or more vanes 66, in this instance four such vanes, which are formed from generally flat sided plates projecting radially inwardly from a cylindrical collar 67 secured to the inside of the stem 19 and in the water passage 22 adjacent the nozzle 16. Each of the vanes 66 is curved along its length and is inclined with respect to the axial direction of the water passage 22 through the stem 19, and has a generally triangular shape with an exposed inclined edge 68 tapering downwardly into the collar 67 as viewed in FIG. 2.

The degree of curvature and the angle of inclination of each vane 66 is determined by the pitch of the spiral motion of the water spinning through the water passage 22 in the stem 19 toward the nozzle 16. Preferably, the degree of curvature and angle of inclination are selected and arranged such that when the water is spinning in one direction, for example the clockwise direction in FIG. 3, the water will flow smoothly and uniformly over the vanes 66 with little or no interaction with the sides of the vanes. When formed in this manner, the spin of the water will proceed in a uniform and orderly manner substantially uninhibited through the nozzle opening 21 when the nozzle 16 is rotating in a clockwise direction, but will be cancelled due to interaction with the vanes 66 when rotating in the counterclockwise direction.

As diagrammatically illustrated in FIG. 2, when the motor 23 drives the nozzle 16 in a counterclockwise direction, the spinning water will impinge on the sides of the vanes 66 which will cancel the spinning motion of the water. Through this interaction of the spinning water with the vanes 66, the water will be collimated and flow through the nozzle opening 21 with the water particles moving in a direction substantially parallel with the center line of the nozzle opening.

Thus, the bias means 65 of the invention promote early but orderly fall out of water from the sprinkler 10 when the nozzle 16 is rotating in one direction, herein the clockwise direction of FIGS. 1 through 5, and will maximize throw when the nozzle is rotating in the opposite direction so that the distribution of water over the total area irrigated by the sprinkler 10 is enhanced. Further, the enhanced water distribution from the part circle sprinkler 10 is accomplished in a simple, effective, and reliable manner and by apparatus which is relatively inexpensive to manufacture and trouble free in use.

Figure 8:
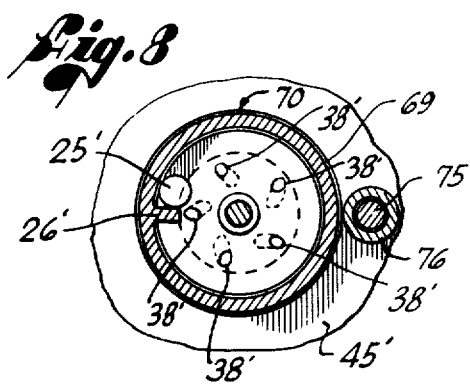
FIG. 8 is a fragmentary sectional view of the embodiment of FIG. 6 and taken substantially along line 8—8 of FIG. 6.
Figure 7:
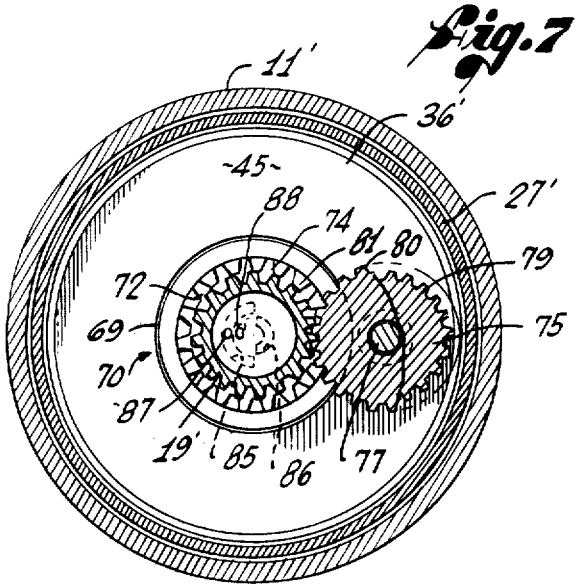
FIG. 7 is a sectional view of the embodiment of FIG. 6 and taken substantially along line 7—7 of FIG. 6.

As illustrated in the exemplary embodiment of FIGS. 6 through 8, the present invention can also be embodied in a sprinkler 10' of the type intended to only rotate in one direction for irrigating a full circular area around the sprinkler. In this instance, the sprinkler 10' is also of the pop-up type somewhat similar to that previously discussed in connection with the part circle sprinkler of FIGS. 1 through 5, and parts of the sprinkler of FIGS. 6 through 8 which find substantial correspondence in structure and function to those previously discussed in connection with FIGS. 1 through 5, have been designated with corresponding primed reference numerals.

Referring to FIG. 6, a discharge nozzle 16' is threaded to the upper end portion of a tubular outlet stem 19' and is shown recessed in a central opening 20' in a cover 13' secured to a cup shaped housing 11' threaded to the end of a water supply pipe 12'. When water is supplied to the sprinkler 10' under pressure, the nozzle 16' is extended in the direction of the arrow of FIG. 6 to an operative irrigating position above the cover 13'. The nozzle 16' is biased to the inoperative position by a spring 35' below the cover 13'.

The nozzle 16' and stem 19' are rotated in only one rotary direction by a water driven motor 23' supposed in a casing 24' which includes a central cylindrical section 27' non-rotatably secured to the inside of the housing 11', and an upper section 31' upstanding from the central section and surrounding a portion of the stem. The stem 19' herein is journaled for rotation within the upper section 31' of the casing 24' and is supported by stacked thrust bearings 33' and a single journal and filter bearing 34', with an O-ring packing seal 60' interposed between the upper section and the stem to prevent leakage of water outside the casing around the stem.

To close the casing 24' and impart a spinning motion to water entering the casing from the supply pipe 12', a bottom plate 36' is secured to the bottom of the central section 27' of the casing. As best can be seen in FIG. 8, herein water is admitted into the casing 24' through five inlet ports 38' through the bottom plate 36' and which are each disposed to extend upwardly and radially outwardly with respect to the center of the bottom plate, and to be inclined with respect to the axis about which the nozzle 16' rotates so that water entering the casing will be imparted with a spinning motion in counterclockwise direction.

Supported for free movement over the upper surface 45' of the bottom plate 36' is a drive ball 25' for imparting incremental rotation to the nozzle 16'. The ball 25' is driven by the spinning water from the inlet ports 38' in a counterclockwise direction as shown in FIG. 8, and in this instance strikes an anvil 26' formed as a radially inwardly projecting boss from the sidewall 69 of a cylindrical and inverted cup-shaped rotor 70 supported for rotation in a ring shaped recess 71 in the bottom plate 36'.

The upper portion 72 of the rotor 70 is formed with a central water passage 73 of reduced diameter and which is axially aligned with the water passage 22' through the stem 19', and has gear teeth 74 formed around the outer periphery for mechanically coupling the rotor with the stem through a transfer gear 75. As shown in FIG. 6, the transfer gear 75 is supported at its lower end by a tubular sleeve 76 upstanding from the bottom plate 36', and at its upper end by a downwardly projecting post 77 formed on the upper portion of the casing 24, and which projects into a recess 78 in the upper end of the transfer gear.

The transfer gear 75 has a lower toothed portion 79 engaged with the teeth 74 of the rotor 70, and an upper toothed portion 80 of enlarged diameter and which engages teeth 81 formed around the outer periphery of the lower portion of the stem 19'. While any suitable gear ratio can be used, in the illustration of FIG. 6, the diameters of the engaged teeth are such that for each rotation of the rotor 70, the transfer gear 75 will produce two revolutions of the stem 19' which herein is supported for relative rotation by the rotor through a thrust bearing 82 interposed between the upper end of the rotor and the lower end of the stem.

To produce periodic reversal of the direction of spin of water entering the stem 19', since the rotor 70 is continuously supplied with water spinning in only one direction, two aperatured disks 83 and 84 are provided between the rotor and the stem across the water passages 73 and 22'. As can be seen in FIGS. 6 and 7, the lower disk 83 is secured to the upper end portion of the rotor 70 for similtaneous rotation therewith and encludes two semi-circular aperatures 85 and 86 extending in an axial direction through the disk, the first aperature 85 being spaced radially outward further from the center of the disk than the second operature 86 and located diametrically opposite the second operature.

The lower disk 83 serves to cancel the counter clockwise spin of the water leaving the rotor 70 so that after passing through one of the semi-circular aperatures 85 and 86, the water will have little or no spinning motion. The upper disk 84, on the other hand, functions to impart either a clockwise or counterwise spin to the water after passing through the lower disk 83.

Referring primarily to FIG. 7, it can be seen that the upper disk 84 has two radially separated ports 87 and 88 which extend through the disk in an inclined condition with respect to the axis about which the stem 19' rotates. The inclination of the radially inner port 88 is opposite that of the outer port 87, and is located to communicate with the radially inner aperture 86 through the lower disk 83 while the outer port 87 is positioned to communicate with the outer semi-circular aperature 85 of the lower disk.

In the condition shown, the outer port 87 of the upper disk 84 is in communication with the outer aperature 85 of the lower disk 83 while the inner port 88 is out of register with the inner aperature 86. Thus, water from the passage 73 in the rotor 70 passes through the outer aperature 85 of the lower disk 83 which cancels the water spin, and then passes through the outer port 87 in the upper disk 84 which will reintroduce uniform and orderly spinning movement to the water as it enters the stem 19', in this instance clockwise spinning movement.

As the rotor 70 and stem 19' rotate, the upper and lower disks 84 and 83, respectively, undergo relative rotation with the outer port 87 traveling along the outer aperature 85. After one complete revolution of the stem 19', the outer port 87 will have traveled past the end of the outer aperature 85 and out of communication therewith. When the outer port 87 is disaligned with the outer aperature 85, the inner port 88 is aligned with the inner aperature 86 and communicates therewith during the next full rotation of the stem 19'.

While the inner port 88 is aligned with the inner aperature 86, water flowing into the stem 19' has a uniform and orderly spinning motion opposite that created by the outer port 87. Herein, the inner port 88 when aligned with the inner aperature 86 will impart to the water passing through the port a counterclockwise spin. Thus, during one revolution of the stem 19' and nozzle 16', water spins up the stem in a spiral path with a clockwise direction of spin, and during the next revolution the water has a counterclockwise direction of spin and this reversal in the direction of spin continues during subsequent rotations of the stem and nozzle as the ports 87 and 88 move into and out of communication with their respective aperatures 85 and 86.

In accordance with another aspect of the present invention, water fall out distribution from the full circle sprinkler 10' is enhanced by providing bias means 65' which operate to permit the water to which a spinning motion in one direction has been imparted by the upper disk 84 to continue its spin through the nozzle 16' for rapid fall out, and which cancels the spin of the water imparted by the upper disk in the direction opposite the one direction to thereby collimate the flow through the nozzle for maximization of the distance of water throw.

Herein, the water spinning in the counterclockwise direction by virtue of the inner port 88 reacts against the bias means 65' which comprise inclined and arcuately curved triangular vanes 66' projection inwardly from a collar 67' to cancel spin during one complete revolution of the nozzle 16', and during the following complete revolution of the nozzle, the bias means permit the clockwise spin imparted by the outer port 87 to pass substantially uninhibited through the nozzle. Thus, it can be appreciated that the bias means 65' can be used to enhance water fall out distribution over the entire area irrigated by the full circle sprinkler 10' even though the water used to drive the sprinkler is always initially imparted with a spinning motion in only one direction.

From the foregoing, it should be apparent that the present invention can be employed to enhance the water fall out distribution from either a full circle or a part circle sprinkler by introducing substantially uniform and orderly spinning movement to the water prior to entry into the stem, reversing the direction of spin periodically, and permitting the water having one direction of spin to pass through the nozzle in the spinning condition while cancelling the spinning motion and colliminating the flow through the nozzle when the water is spinning in the reverse direction. Further, the bias means 65, of the invention provide an effective, reliable and non moving apparatus for cancelling the spinning motion of the water when spinning in one direction, and for permitting the spin to continue substantially uninhibited when the water is spinning with the reverse direction of motion.

While particular forms of the invention have been illustrated and described, it should also be apparent that modifications and variations therein can be made without departing from the spirit and scope of the invention.

I claim:

1. A rotary water sprinker of the type primarily intended to be used in the irrigation of plants, said sprinkler comprising:
    a housing adapted for connection to a water supply;
    a tubular stem mounted for rotation in said housing;
    a water discharge nozzle coupled to the end of said stem and rotatable therewith;
    drive means for rotating said stem;
    means within said housing for imparting a generally uniform and orderly spinning motion in one direction to water entering said stem, and for selectively and alternately reversing the direction of spin of the water entering said stem; and
    bias means carried by said stem for cancelling the spinning motion of the water spinning in one of said directions in said stem, and for permitting the spinning motion of said water in the other of said directions of spin to continue substantially uninhibited through said nozzle with said spinning motion.

2. A sprinkler as defined in claim 1 in which said drive means for rotating said stem comprise a water operated motor mounted in said housing and said bias means comprise stationary inclined vanes mounted in said stem adjacent said nozzle.

3. A sprinkler as defined in claim 2 wherein said water operated motor is a reversible motor for rotating said stem in either a clockwise or counter-clockwise direction, and in which said means for imparting spinning motion include a swirl plate within said motor and which reverses the direction of water spin incident to a reversal of the direction of rotation of said stem.

4. A sprinkler as defined in claim 2 wherein said motor drives said stem in only one direction and said means for imparting spinning motion are coupled between said motor and said stem.

5. A sprinkler as defined in claim 4 wherein said means for imparting spinning motion comprise a pair of aperatured disks, one secured to said stem and one secured to said motor.

6. A method for enhancing the fall out distribution of water from the nozzle of a rotary sprinkler over the area to be irrigated, comprising the steps of:
 imparting a generally uniform and orderly spinning motion in one direction to water flowing through the sprinkler and prior to entering the nozzle;
 selectively reversing the direction of the spinning motion imparted to the water prior to entering the nozzle;
 permitting the water to which the spinning motion in said one direction has been imparted to pass through the nozzle in said spinning condition whereby upon leaving the nozzle, the spinning water will expand rapidly for controlled and early fall out; and
 cancelling the spinning motion of the water to which said reverse direction of spinning motion has been imparted prior to entering the nozzle is that the water passing through the nozzle is collimated whereby upon leaving the nozzle, the collimated water will tend to remain in a tight stream for maximized distance of throw from the nozzle before fall out.

7. In a rotary water sprinkler of the type including a housing adapted for connection to a water supply, a tubular water outlet stem mounted for rotation in the housing and terminating in a discharge nozzle, a water operated motor for rotating the stem and nozzle, and means within the housing for directing water from the supply into the stem with, alternately, a clockwise and counter clockwise spinning motion, the improvement comprising:
 bias means for permitting the water having a spinning motion in one of said alternate directions to pass through and be discharged from the nozzle in the spinning condition, and for cancelling the spinning motion and collimating the flow of the water having a spinning motion in the other of said alternate directions prior to discharge through the nozzle.

8. The improvement as defined in claim 7 in which said bias means comprise at least one stationary vane carried by the stem and disposed to permit the water spinning in said one direction to flow substantially uninhibited and smoothly over said vane, and to interact substantially with the water spinning in said other directions to cancel the spinning motion and collimate the flow.

9. The improvement as defined in claim 8 wherein said vane is positioned adjacent the nozzle and comprises a generally flat sided plate projecting radially inward from the stem and inclined with respect to the axial direction of the stem.

10. The improvement as defined in claim 8 wherein the sprinkler is a part circle type sprinkler and the water motor is a reversible motor which reverses the direction of spinning motion of the water each time the motor direction is reversed.

11. The improvement as defined in claim 8 wherein the sprinkler is a full circle type sprinkler rotatable in only one direction.

* * * * *